United States Patent [19]
Williams

[11] Patent Number: 5,018,583
[45] Date of Patent: May 28, 1991

[54] WELL PROCESS USING A COMPOSITE ROD-STIFFENED PRESSURIZED CABLE

[75] Inventor: Jerry G. Williams, Ponca City, Okla.
[73] Assignee: Conoco Inc., Houston, Tex.
[21] Appl. No.: 495,004
[22] Filed: Mar. 15, 1990
[51] Int. Cl.5 .................. E21B 19/22; F16L 11/12; H01B 7/18; H02G 1/08
[52] U.S. Cl. .................................... 166/385; 166/77; 166/65.1; 166/384
[58] Field of Search ............... 138/174, 103, 123–126, 138/DIG. 5; 166/385, 384, 77, 242, 72, 65.1; 29/523; 254/134.3 R, 134.3 FT, 134.3 SC, 134.4

[56] References Cited
U.S. PATENT DOCUMENTS

| | | | |
|---|---|---|---|
| 3,055,424 | 9/1962 | Allen | 166/384 |
| 3,212,582 | 10/1965 | Brown | 166/242 |
| 3,234,723 | 2/1966 | Brown | 166/242 X |
| 4,002,817 | 1/1977 | DeGrado | 254/134.3 R |
| 4,024,913 | 5/1977 | Grable | 166/72 |
| 4,416,329 | 11/1983 | Tanner et al. | 166/68 |
| 4,427,033 | 1/1984 | Ege | 138/174 X |
| 4,452,314 | 6/1984 | Zion | 166/378 |
| 4,529,148 | 7/1985 | Hesprich et al. | 254/134.3 R |
| 4,592,421 | 6/1986 | Hoffmann et al. | 166/68 X |
| 4,681,169 | 7/1987 | Brookbank, III | 166/385 |
| 4,715,443 | 12/1987 | Gridley | 166/242 X |

Primary Examiner—Stephen J. Novosad

[57] ABSTRACT

A wire line cable in which composite rods are spaced apart and axially disposed between a flexible, elongated, membrane which can be pressurized and a flexible outer protective sheath surrounding but separate from the membrane.

10 Claims, 2 Drawing Sheets

WELL PROCESS USING A COMPOSITE ROD-STIFFENED PRESSURIZED CABLE

BACKGROUND OF THE INVENTION

It has become relatively common within the last few years to drill wells in the search for oil and gas and the like with a portion of the wellbore deviating from the usual vertical orientation. The deviation may extend for a considerable distance at a substantial angle from the horizontal and then return to the usual vertical orientation. In drilling such wells, a device known as a whip stock is set at spaced intervals along the wellbore as the drilling progresses to cause the wellbore to deviate from the vertical until the desired, relatively horizontal deviation angle is attained. The wellbore is then drilled for as much as several thousand feet along the deviation angle and may be returned to the vertical orientation by setting the whip stock at spaced intervals as previously mentioned.

As is well known in the art of drilling wells, there are many well tools including such as well logging tools that are generally run into the wellbore on a wireline and/or cable to perform various operations therein. Such tools depend upon the force of gravity to permit positioning of the well tools at the desired formation in the wellbore.

Logging for vertical wells is performed using steel wireline cables to transport the logging tools. The weight of the tool forces the tool and line down to the bottom of the hole. In deep horizontal wells and in highly deviated wells, the force vector component pushing the tool down the hole is insufficient to overcome the frictional forces of the tool and line rubbing on the walls of the hole and alternate methods must be used. One of the current methods for logging deviated and horizontal wells is to use the drill pipe to transport the logging tool. This method however is time consuming and expensive. In addition, the high mass of magnetic material can interfere with some logging instruments.

In recent years, coiled steel tubing has been used to log horizontal holes and deviated wells. Steel tubing is limited to diameters on the order of 1.5 inches and wall thicknesses to around 0.1 inches in order to permit spooling. This small size limits the available bending stiffness to resist buckling and tensile strength required to pull the tubing out of the hole. The tensile strength limitation establishes a critical depth for the steel tubing beyond which it cannot be used since the weight of the tubing exceeds its own strength. The strength factor limitation prohibits coiled tubing from logging some extended reach wells.

It has become essential to provide some means of forcing wireline actuated tools through horizontal wells and highly deviated wells particularly when such wells are of substantial depth.

THE PRIOR ART

U.S. Pat. No. 4,024,913 to Grable teaches the use of a parallel lay cable in which strands of Kevlar ® are individually encased in a polymer (such as epoxy or nylon) and surrounded by a protective sleeve. The cable is capable of withstanding both compressive and tensile forces, can be spooled, and in the specific application described, is useful as a sucker rod.

U.S. Pat. No. 4,416,329 to Tanner et al. discloses a flat ribbon for use as a sucker rod comprised of graphite fibers in a thermoset resin and encased in a textile jacket. The ribbon can be spooled and can withstand both compressive and tensile loads.

U.S. Pat. No. 4,452,314 to Zion teaches the use of a fibrous material (glass) reinforcing a thermosetting resin forming a cylindrical tube which is used as a sucker rod.

U.S. Pat. No. 4,592,421 to Hoffman et al discloses the use of uni-directional reinforced composite fiber rods as sucker rods.

THE INVENTION

In accordance with this invention, there is provided a spoolable wireline cable comprising an axially elongated pressurizable flexible membrane member covered by an outer flexible protective sheath separate from said membrane member and a plurality of parallel composite rods spaced from each other and disposed axially between said membrane and said sheath. In one aspect of the invention, the composite rods are attached to the membrane member. In another aspect, they are attached to the flexible protective sheath. In still another aspect of the invention, the spoolable wireline cable, when pressurized, forms a stiffened cylinder having an extremely high buckling strength which may be used to force well tools through horizontal wells and highly deviated wells.

DETAILED DESCRIPTION OF THE INVENTION

Figure 1:
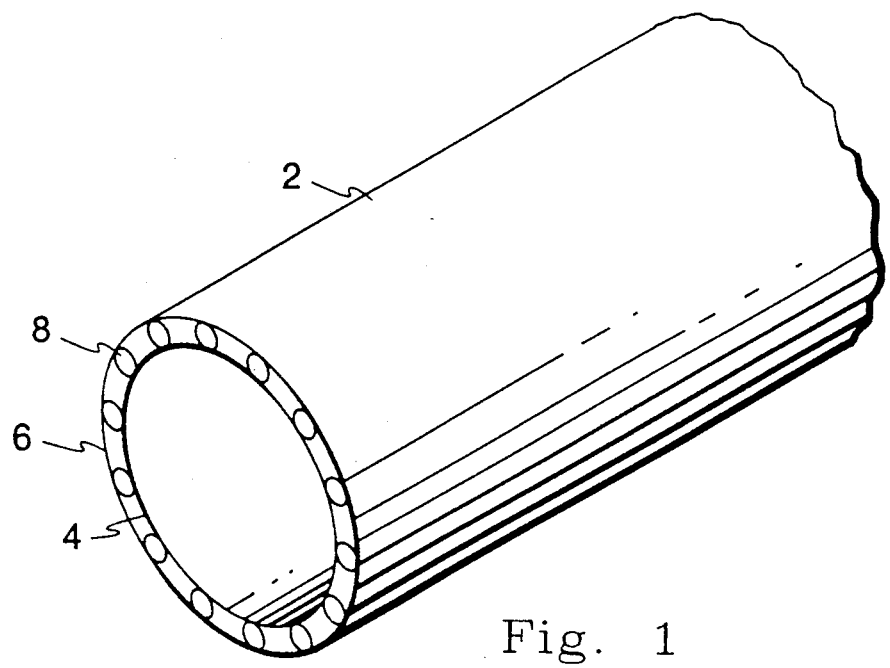
FIG. 1 is a schematic drawing of a section of pressurized cable.

The invention is best described by reference to the drawings. FIG. 1 shows a section of pressurized cable 2. The cable is made up of an outer flexible protective sheath 6 and a flexible membrane member 4. A plurality of parallel composite rods 8 are spaced from each other and disposed axially between the membrane 4 and outer sheath 6.

The composite rods used in the pressurized cable may be made from a number of different materials. Preferred are uni-directional graphite fibers pultruded using a plastic binder such as vinyl ester. epoxy, or a thermoplastic or thermosetting resin. Composite rods formed in this manner have a high uniaxial stiffness. Such composite rods have been made for other applications and are commercially available. Composite fiber rods may also be made from such materials as glass fibers, ceramic fibers, polymer fibers, for example from Kevlar ® polymer which is a product of the Du Pont company and from Exten ® polymer which is a product of the Goodyear Corporation. The plastic binders mentioned, among others, may be used in the preparation of composite rods from these materials.

The composite rods are designed in diameter to meet a number of design constraints. Based on the number of rods used in the cable, a sufficient diameter must be used to provide the required thrust to force the well tool into the horizontal or deviated hole. The rods must also be designed to buckle in a controlled manner without failure. Also, the rods must be sized to permit the unpressurized cable to be spooled onto a reasonable size spool. The primary design load for the pressurized cable is compression. In service, the pressurized cable will buckle in a controlled manner without exceeding material strength and strain allowables. The elastic energy stored in the buckled configuration provides a thrust vector which is applied to the well tool.

Individual composite rods are usually sized to a diameter of between about 0.1 and about 0.5 inches. The number of rods used in a pressurized cable will depend on the size of the cable and usually varies between about 5 and about 200 rods. The cable itself usually has a diameter of between about 2 and about 20 inches.

The membrane which forms the inner surface of the pressurized cable may be formed of a plastic material such as Mylar or a rubber material either synthetic or natural. The membrane must be sufficiently flexible to form a flattened member when unpressurized and have sufficient strength to react the pressure used to hold the composite rods against the outer protective sheath of the cable when the membrane is inflated. Since the composite rods are to be maintained in a spaced relationship to each other, it is preferred that the surface of the membrane in contact with the rods have a high coefficient of friction. Rubber materials are particularly suited for this purpose.

The cylindrical outer protective sheath may be filament wound, braided or otherwise fabricated into a composite cylinder, which may be impregnated with a flexible resin matrix; capable of withstanding the pressure required to pressurize the cable. Materials such as fiberglass with a flexible matrix, such as a rubber may be used for the outer protective sheath. If the inner surface of the outer protective sheath does not have a high coefficient of friction, a coating of rubber or other suitable material may be provided on the surface to hold the composite rods in the desired spacial relationship.

In service, the pressurized cable will buckle and at the points of buckling will impose a normal force on the walls of the casing or open hole. This force will create friction as the pressurized cable is translated down the hole. One of the purposes of the flexible protective sheath is to resist wear and friction. For this reason, it is desirable to use a coating or a covering on the outside of the sheath which has a low coefficient of friction and is wear resistance. Materials such as Teflon ®, Kevlar ®, or Kevlar ® frit may be used for this purpose.

In the pressurized cable, the rods stiffen the skin of the pressurized membrane. The composite rods are loosely connected to the membrane in the unpressurized state. For example, each rod may be tacked to the membrane with a resin material at suitable intervals. When pressurized, the frictional force between the membrane and rods, provide transfer shear connectivity which significantly increases the local skin bending stiffness to resist local buckling. The rod stiffened pressurized cylinder formed is a stiffened cylindrical shell with significantly greater bending stiffness than is provided by the composite rods or membrane alone. This design has significantly greater capability to provide thrust to move the well tool than is provided by other cables.

As previously stated, the high stiffness composite rods are uniformly spaced and contained on the outside diameter of the flexible membrane. This assembly is constrained to expand laterally by the cylindrical flexible protective outer sheath. Pressurization of the membrane forces the external rods against the flexible cylindrical structure of the protective sheath which develops friction between the rods and the pressurized membrane and the outer flexible sheath. This friction creates the transverse shear stiffness which causes the assembly to act together as a stiffened shell structure to provide high bending stiffness.

Figure 2:
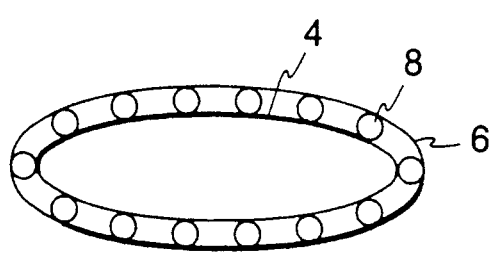
FIG. 2 is a schematic drawing of an end view of the same cable as it would exist in the flattened state on a drum.

Referring again to the figures, FIG. 2 illustrates the cable of FIG. 1 in the collapsed state, which would be suitable for winding the cable on a spool. While the membrane 4 is flexible, it would not lie entirely flat when not pressurized nor would the outer sheath 6. The composite rods are spaced between the membrane 4 and outer sheath 6 in the same manner as in FIG. 1.

Figure 3:
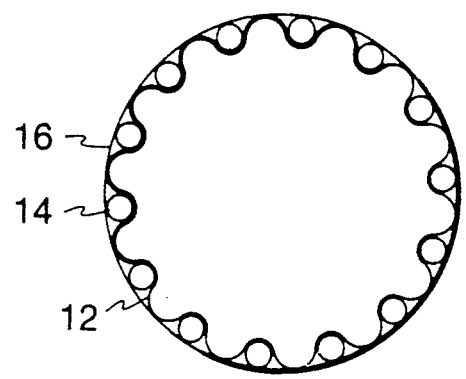
FIG. 3 is a schematic end view of a pressurized cable in which the pressurized membrane is sized to provide overlap of the stiffener composite rods.

Referring to FIG. 3, it is possible to make the flexible membrane of a larger diameter than the inside of the outer sheath 16. With this type of arrangement, the membrane 12 will overlap the composite rods 14 when expanded and when it is of sufficient size, it will contact the outer sheath 16 between the rods 14 when expanded. With this type of arrangement, it would probably be desirable to loosely attach rods 14 to the inside of the flexible protective sheath 16, rather than to the membrane 12.

Figure 4:
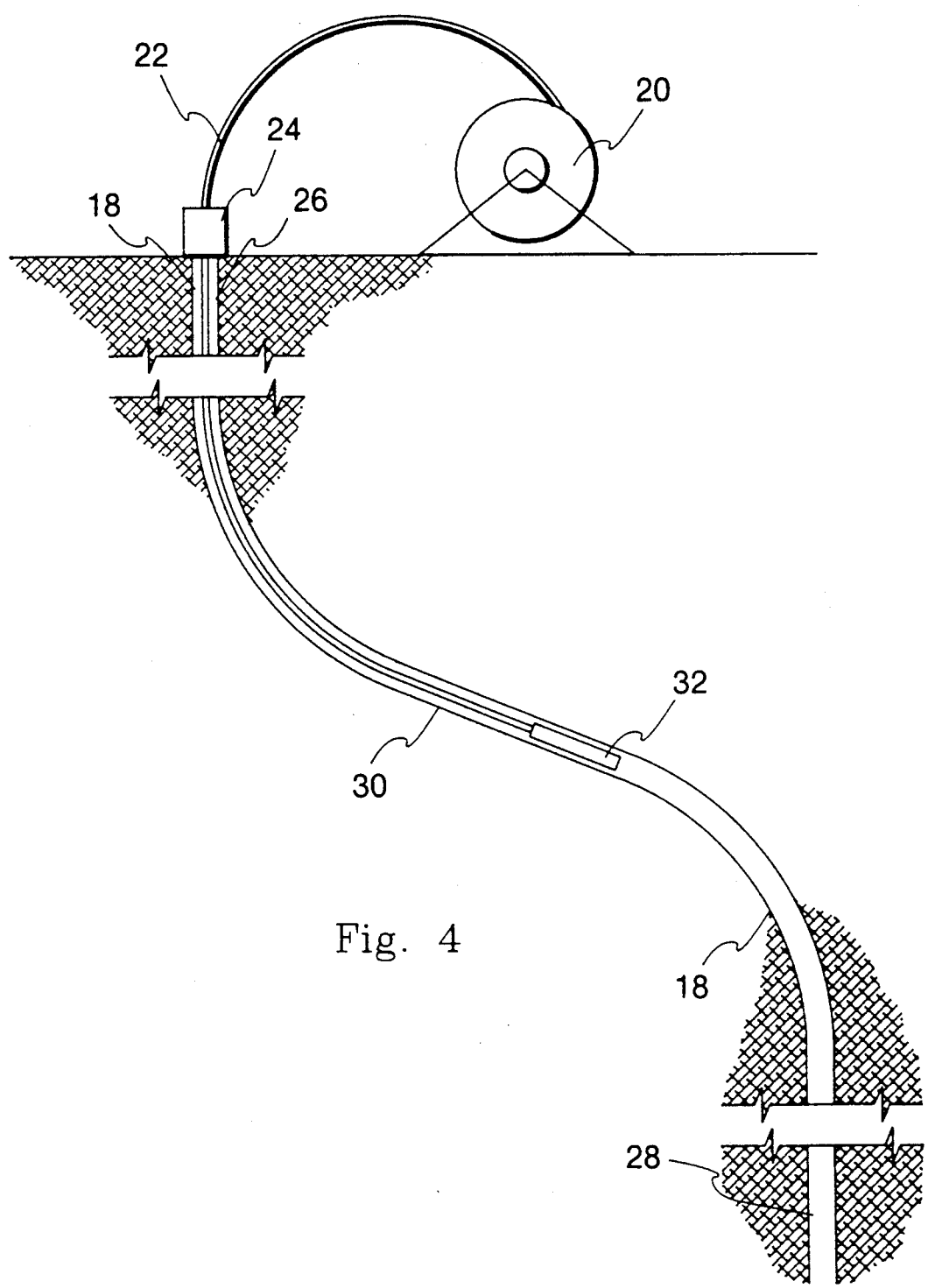
FIG. 4 is a schematic drawing illustrating the use of the pressurized cable in a deviated well.

Referring now to FIG. 4, a wellbore generally designated by the reference character 18 is shown. The wellbore has a vertical upper portion 26 extending to the surface, a vertical lower portion 28 and a deviated portion 30 connecting the upper and lower portions 26 and 28. The vertical portion 26 and the deviated portion 30 are normally several thousand feet in length, while vertical portion 28 is usually much shorter. The wellbore may also terminate in a near horizontal section.

Arranged in operable relationship to the wellbore 18 and located on the surface is an injector assembly designated by the reference character 24. A reel 20 is also provided on the surface and the pressurizable cable 22 is stored on this reel. Cable 22 is stored on reel 20 in the flat position and is expanded by pressurization when it leaves the reel. Pressurization may be effected in a number of ways, for example, drilling mud, brine or other suitable liquid may be introduced to the cable below injector 24 by a small hose or line placed inside the cable. This hose can run the length of the cable and the pressurizing liquid can be introduced at the end of the cable stored on spool 20. If rollers are used as a guide in injector 24 and also to drive the pressurized tube down the hole, the top set of rollers may be used to crimp off the pressure. This would assure that the cable would be flat on the spool and only assume a circular cross section after passing through the crimp roller.

Spool 20 and injector 24 are not detailed since these types of apparatus are well known in the art. For example, specific spool and injector arrangements are shown in U.S. Pat. Nos. 3,401,794; 3,722,594; and 4,682,657, among others.

OPERATION

After the apparatus shown in FIG. 4 has been assembled, the pressurized cable 22 is extended through injector 24. The pressure in the pressurized cable will usually be between about 10 and about 200 psig above the formation pressure. In any event sufficient pressure is used to assure that the composite rods are securely held in their spacial relationship between the membrane and outer sheath. The desired well tool such as a logging tool 32 is then attached to cable 22 and is placed in the upper portion 26 of well 18 and is lowered into the well by gravity. When well tool 32 reaches the deviated portion 18 of the well, the frictional engagement of the tool with the wall of this deviated portion is sufficiently great to overcome the force of gravity. When this occurs, injector 24 is used to apply downward force to the pressurized cable such that the logging tool 32 is forced into and along the deviated section 18. In the event that continuous application of force by injector 24 is not sufficient for this purpose, the injector may be operated to provide alternate upward and downward movement of the pressurized cable and logging tool 32 in order to assure continued downward progress. Pressure pulsing of the cable may also be used for this purpose. Actuation of the logging tool at desired intervals is carried out by appropriate conductors placed within or made integral with the pressurized cable and attached to the logging tool.

When logging tool 32 leaves the deviated portion of the well and enters vertical portion 28 further hindrance to movement of the tool may occur. In this event, the procedure described may be repeated to provide further downward movement of the logging tool.

If a different type of well tool is being used other than logging tool 32, for example, a perforating tool, the apparatus is connected and moved to the proper zone or formation in wellbore 18 in the manner previously described. After reaching the desired zone, the appropriate switch or switches may be operated to fire the perforating tool through electrical circuits contained within the pressurized cable.

The pressurized cable of the invention provides high bending stiffness and therefore the high column buckling stability required to push upon one end of the pressurized cable and transmit a large force vector to move an object such as a well logging tool at the other end down horizontal and deviated wells. Without the stability offered the rods by the pressurized membrane, they would buckle individually and have an axial and bending stiffness which is equal only to the sum of their individual axial and bending stiffnesses. With the pressurized membrane stabilizing the rods, the bending stiffness is increased dramatically as the sum of the square of the distance of the individual rods from the centroid times the area of the rods times the axial modulus of the rods.

In forming composite structures, several known techniques may be used such as pultrusion, filament winding, and molding. In pultrusion, filaments or fibers are drawn through a resin impregnating apparatus; then through dies to provide the desired shapes. Heat forming and curing means are provided in conjunction with the dies. Finally, the desired product which is produced continuously may be wound on a reel or spool. As an example, pultrusion is used in U.S. Pat. No. 4,416,329 to prepare a ribbon structure containing bundles of graphite fibers saturated with thermoplastic resin. The faces of the ribbon are covered with plies of woven material, such as glass fabric. Corner tows on the ribbon are made of Kevlar ® or glass. U.S. Pat. No. 4,452,314 uses pultrusion to form arcuate sections comprised of glass filaments or other reinforcing material disposed in a thermosetting resin. The arcuate sections are combined to form a sucker rod.

While any of the known fabrication techniques may be used, pultrusion is the preferred procedure for preparing the pressurized cable of the invention. This procedure is particularly applicable since it enables the cable to be produced as a continuous product to whatever length is desired.

In addition to the advantages of the flexible pressurized composite cable of the invention which have already been disclosed, there are a number of other advantages to using this type of cable. For example, the speed with which logging can be carried out using the continuous pressurized cable offers the opportunity to conduct logging operations more frequently thereby obtaining greater frequency of data to better evaluate the formation production potential. Since the pressurized cable is very stiff in the axial direction, the stretch of the line in tension will be minimal compared to the stretch of typical steel wirelines currently used in logging operations. This increased axial stiffness in tension will provide increased accuracy in determining the precise location for which logging data is obtained. The high axial strength of the pressurized cable permits high tension loads to be applied to the logging tool in the event that is becomes stuck in the hole, as previously described. The strength of the pressurized cable can be several time the failure load of commonly used wirelines. Wireline operations are typically designed to fail at the connection to a logging tool to more easily facilitate fishing operations to remove the tool. The higher strength of the pressurized cable will in many cases eliminate the need for fishing because the tool will simply become unstuck using its high strength capability. The low density of the composite materials used in the pressurized cable is close to the density of drilling mud. This aspect will reduce the frictional loads associated with gravity. The non-magnetic property of the pressurized cable permits some logging operations to be performed more accurately and precisely. Still another advantage, the logging operation can be conducted in a continuous operation as proposed to discrete segments when performed using the drill pipe for conveyance of the logging tool.

Experiment

An experiment was conducted in which a steel wire dryer hose served as the flexible outer sheath and two 0.25 inch pultruded Kevlar ® rods wire located diametrically opposite each other inside the dryer hose. Air was then used to pressure a bicycle tube inside the dryer hose. The pressurized bicycle tube was forced against the Kevlar ® rods to provide shear stiffness to restrict the Kevlar ® rods from sliding relative to the bicycle tube membrane or dryer hose. The assembly became very stiff in bending when the assembly was bent about the maximum moment of inertia (one rod placed in compression, the other in tension) and was significantly higher in stiffness than when the assembly was bent about the moment of inertia (in which the rods are located at the neutral axis).

This experiment establishes that local and global bending resistance can be significantly increased by the transverse shear stiffness achieved when membrane and stiffeners are frictionally tied one to the other. Of course, equal bending stiffness in all directions may be provided by the use of a plurality of pultruded composite rods spaced around the outer periphery of the membrane.

While certain embodiments and details have been shown for the purpose of illustrating the present invention, it will be apparent to one skilled in the art that various changes and modifications may be made herein without departing from the spirit or scope of the invention.

I claim:

1. In a process in which a wireline actuated well tool is run into a wellbore by a spooled cable, the improvement which comprises utilizing as the cable an internally fluid-pressurized flexible membrane member stiffened with a plurality of parallel uni-directional composite rods spaced from each other and disposed axially on the outside of and in contact with said membrane, said pressurized membrane member being covered with an outer cylindrical flexible protective sheath separate from said membrane member, the combination forming a stiffened cylindrical cable having high resistance to buckling.

2. The process of claim 1 in which the cable is internally fluid-pressurized as it leaves the spool and enters the well.

3. The process of claim 2 in which the composite rods are composed of graphite.

4. The process of claim 3 in which the outer surface of the pressurized membrane member and the inner surface of the outer flexible protective sheath have a high coefficient of friction.

5. The Process of claim 1 in which the pressurized membrane member is of sufficient cross-section to extend beyond and overlap the composite rods.

6. The process of claim 5 in which the pressurized membrane member is of sufficient cross-section to overlap the composite rods and contact the protective sheath.

7. The process of claim 1 in which the wellbore has one or more deviated intervals.

8. A process for running a wireline actuated well tool into a wellbore comprising the steps of:
   connecting the well tool to the end of an internally fluid-pressurized cable comprising a flexible membrane member, a plurality of parallel unidirectional composite rods spaced from each other and disposed axially outside of and in contact with the membrane member, and an outer cylindrical flexible protective sheath covering the flexible membrane member and the composite rods;
   inserting the well tool into the well; and
   running the tool down into the well by the cable.

9. The process according to claim 8 further comprising the steps of providing the cable on a spool and unspooling the cable as the tool is run down the well.

10. The process according to claim 9 further comprising the step of internally fluid-pressurizing the cable as it is unspooled from the cable and enters the well.

* * * * *